United States Patent
Uygun (10) Patent No.: US 9,158,580 B2
(45) Date of Patent: Oct. 13, 2015

(54) DATA FLOWS AND THEIR INTERACTION WITH CONTROL FLOWS

(75) Inventor: Erkut Uygun, Cambridge (GB)

(73) Assignee: Cognovo Limited, Royston, Hertfordshire (GB)

( * ) Notice: Subject to any disclaimer, the term of this patent is extended or adjusted under 35 U.S.C. 154(b) by 265 days.

(21) Appl. No.: 13/436,739

(22) Filed: Mar. 30, 2012

(65) Prior Publication Data

US 2013/0091504 A1 Apr. 11, 2013

(30) Foreign Application Priority Data

Apr. 1, 2011 (GB) .................................. 1105585.2

(51) Int. Cl.
*G06F 9/46* (2006.01)
*G06F 9/48* (2006.01)
*G06F 9/50* (2006.01)

(52) U.S. Cl.
CPC ............ *G06F 9/4881* (2013.01); *G06F 9/5016* (2013.01); *G06F 2209/5014* (2013.01)

(58) Field of Classification Search
None
See application file for complete search history.

(56) References Cited

U.S. PATENT DOCUMENTS

| | | | |
|---|---|---|---|
| 6,192,446 B1 * | 2/2001 | Mullarkey et al. | 711/105 |
| 7,370,123 B2 * | 5/2008 | Anjo et al. | 710/20 |
| 2003/0079084 A1 * | 4/2003 | Gotoh et al. | 711/117 |
| 2004/0230621 A1 * | 11/2004 | Croisettier et al. | 707/201 |
| 2005/0102658 A1 | 5/2005 | Li et al. | |
| 2007/0195600 A1 * | 8/2007 | Roohparvar | 365/185.08 |
| 2010/0064113 A1 * | 3/2010 | Lindahl et al. | 711/173 |
| 2011/0154002 A1 * | 6/2011 | Liu et al. | 712/234 |

FOREIGN PATENT DOCUMENTS

| | | |
|---|---|---|
| EP | 1 647 894 A2 | 4/2006 |
| EP | 2 336 878 A1 | 6/2011 |

OTHER PUBLICATIONS

GB Search Report for Counterpart Great Britain Application No. 1105585.2, 1 pg. (Apr. 15, 2012).

* cited by examiner

*Primary Examiner* — Sisley Kim
(74) *Attorney, Agent, or Firm* — Blakely, Sokoloff, Taylor & Zafman LLP (57) ABSTRACT

A method and apparatus for processing data by a computer and a method of determining data storage requirements of a computer for earning out a data processing task.

27 Claims, 7 Drawing Sheets

DATA FLOWS AND THEIR INTERACTION WITH CONTROL FLOWS

FIELD

This invention relates to the field of electronic data processing.

BACKGROUND

Unified Modelling Language (UML) can be used to describe systems. A common use of UML is to provide a description of a system that is to be implemented in software. Traditionally, an analyst will study a system that is proposed for implementation in software and produce a UML description of the system. A programmer will then work from the UML description provided by the analyst in order to produce software that implements the system whilst complying with the constraints of the particular architecture of the computing hardware that is to execute the software. Some examples of such constraints are the amount of memory in the computing hardware and the number and processing speed of the processors in the computing hardware.

UML provides a range of methods for describing systems. One such method is the use of activity diagrams. An activity diagram describes a system in terms of activities and control flows between the activities. The control flows are represented by a set of primitives, and these primitives will now be described by reference to FIGS. 1 to 6.

Figure 1:
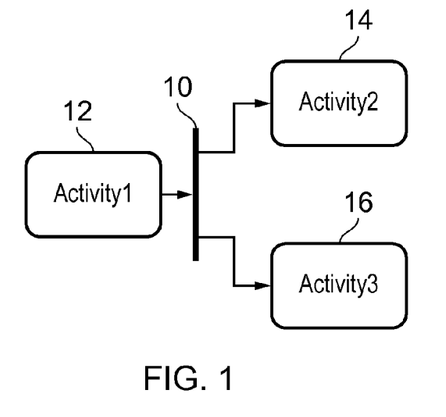
FIG. 1 is a UML activity diagram illustrating use of a fork node.

FIG. 1 shows an activity diagram primitive that is called the fork node. Here a fork node 10 describes the relationship between activities 12, 14 and 16. The fork node 10 indicates that upon completion of activity 12, activities 14 and 16 are commenced concurrently.

Figure 2:
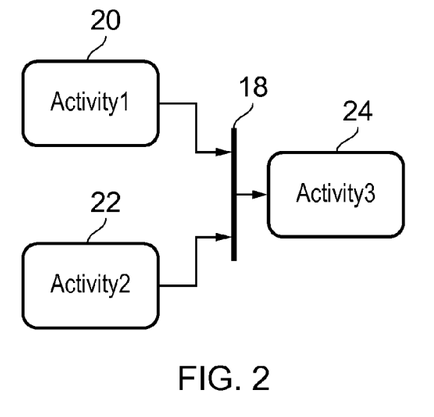
FIG. 2 is a UML activity diagram illustrating use of a join node.

FIG. 2 shows an activity diagram primitive that is called the join node. Here, a join node 18 describes the relationship between activities 20, 22 and 24. The join node 18 indicates that upon completion of both activities 20 and 22, activity 24 is commenced. Thus, the join node primitive has a synchronising effect, in that it allows an activity to commence only after a plurality of other activities have finished.

Figure 3:
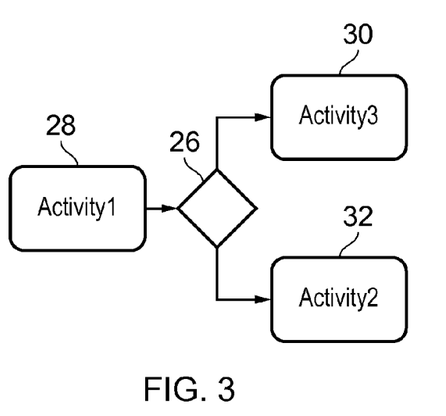
FIG. 3 is a UML activity diagram illustrating use of a decision node.

FIG. 3 shows an activity diagram primitive that is called the decision node. Here, a decision node 26 describes the relationship between activities 28, 30 and 32. The decision node 26 indicates that upon completion of activity 28, only one of activities 30 and 32 is commenced. Which one of activities 30 and 32 is commenced is decided by a logical condition associated with the decision node 26. For example, whether or not a particular parameter of the system is greater or less than some predetermined value.

Figure 4:
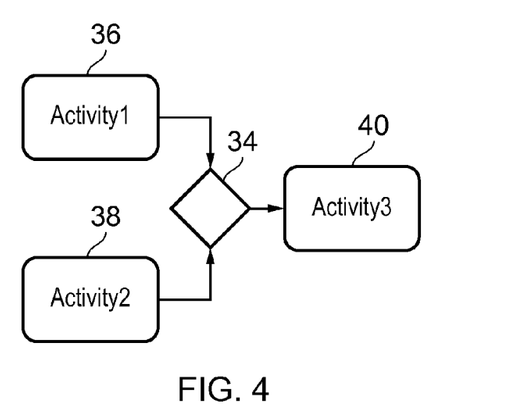
FIG. 4 is a UML activity diagram illustrating use of a merge node.

FIG. 4 shows an activity diagram primitive that is called the merge node. Here, a merge node 34 describes the relationship between activities 36, 38 and 40. The merge node 34 indicates that activity 40 is commenced as soon as either one of activities 36 and 38 is completed.

Figure 5:
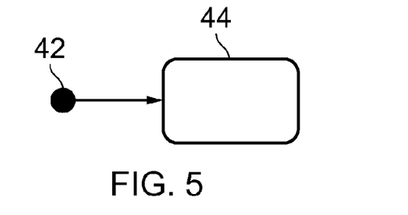
FIG. 5 is a UML activity diagram illustrating use of an initial node.

FIG. 5 shows an activity diagram primitive that is called the initial node. The initial node indicates the start of the system. Here, an initial node 42 indicates that the system begins with the performance of activity 44.

Figure 6:
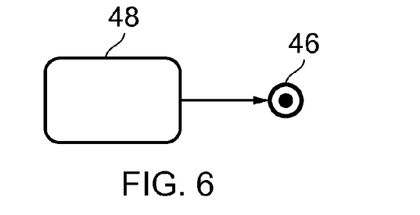
FIG. 6 is a UML activity diagram illustrating use of a final node.

FIG. 6 shows an activity diagram primitive that is called the final node. The final node indicates the end of the system. Here, a final node 46 indicates that the system ends after the performance of activity 48.

So far, nothing has been said about the nature of the activities that the primitives connect. These activities are almost infinitely diverse in nature. Often, an activity will be complex in the sense that it might be capable of being described by its own activity diagram. Multiprocessor systems can be suitable for conducting wireless communications and in that context examples of activities are:
    carrying out a direct memory access (DMA) procedure for moving data from one place to another.
    performing a fast Fourier transform (FFT) on a digital time domain signal.
    performing a cross correlation of two digital time domain signals.
    calculating a cyclic redundancy checksum (CRC) for a data sequence.

SUMMARY

The invention is defined by the appended claim, to which reference should now be made.

BRIEF DESCRIPTION OF THE DRAWINGS

Various embodiments of the invention will now be described, by way of example only, with reference to the accompanying drawings, in which.

DETAILED DESCRIPTION

Figure 7:
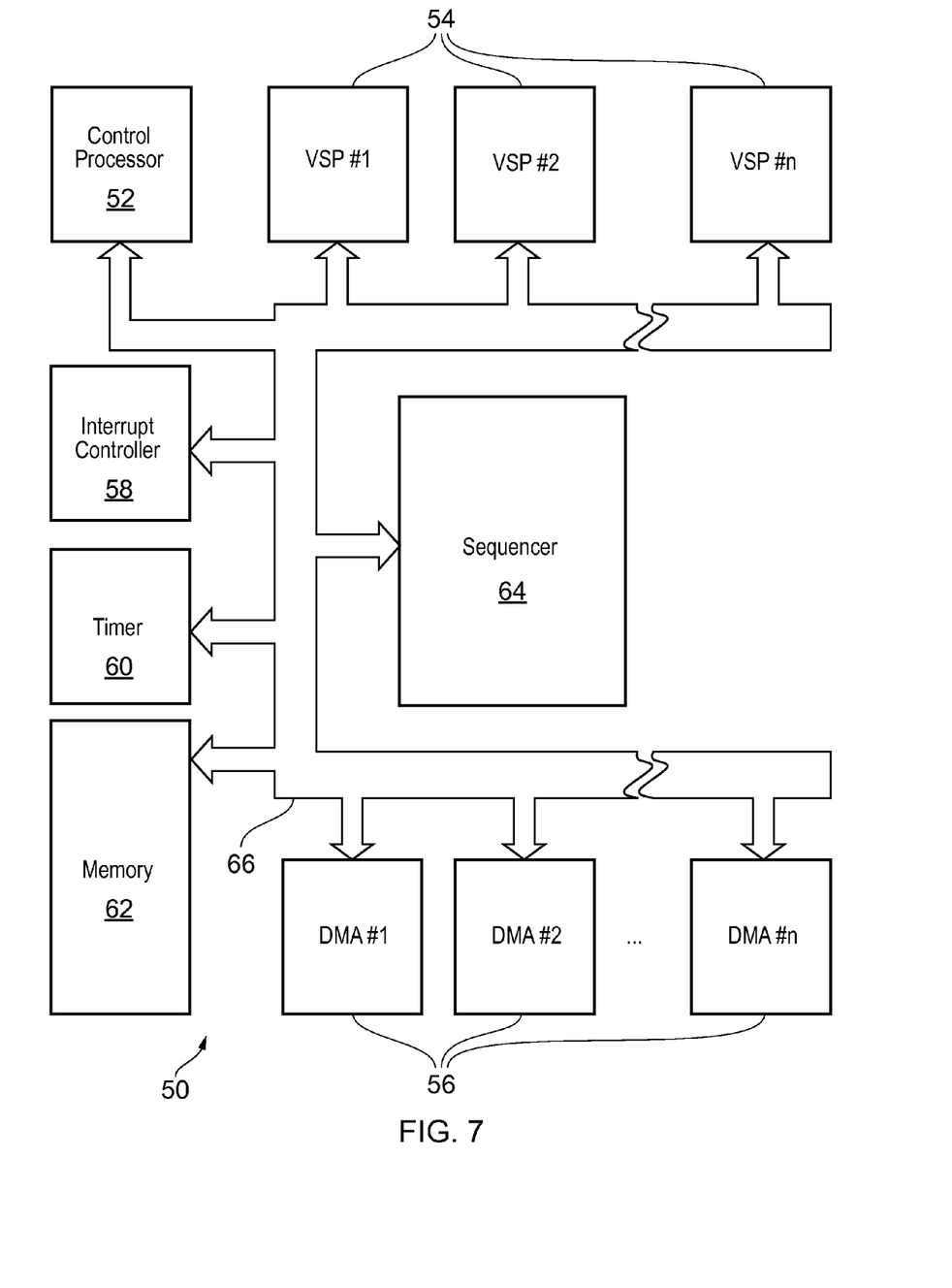
FIGS. 7 and 8 are schematic diagrams of a multiprocessor computer.

Referring to the drawings, FIG. 7 shows a multiprocessor computer 50. Only those elements that are useful for explaining the invention are shown and a person skilled in the field of computer architecture design will appreciate that, in practice, the computer 50 will include many more components and inter-component connections than are shown in FIG. 7. As shown, the computer 50 comprises a central processing unit (CPU) 52, a number of vector signal processors (VSP) 54, a number of direct memory access (DMA) controllers 56, an interrupt controller 58, a timer 60, a memory 62 and a sequencer 64. So that these elements can communicate with one another they are all connected to a bus 66. Furthermore, the interrupt controller 58 is also connected to the CPU 52 by a connection 68, over which it can send interrupts to the CPU. The architecture of the computer 50 is scalable, for example in that the number of DMA controllers 56, the number of vector signal processors 54, and the size of the memory 62 can all be varied and additional timers could be added.

Figure 8:
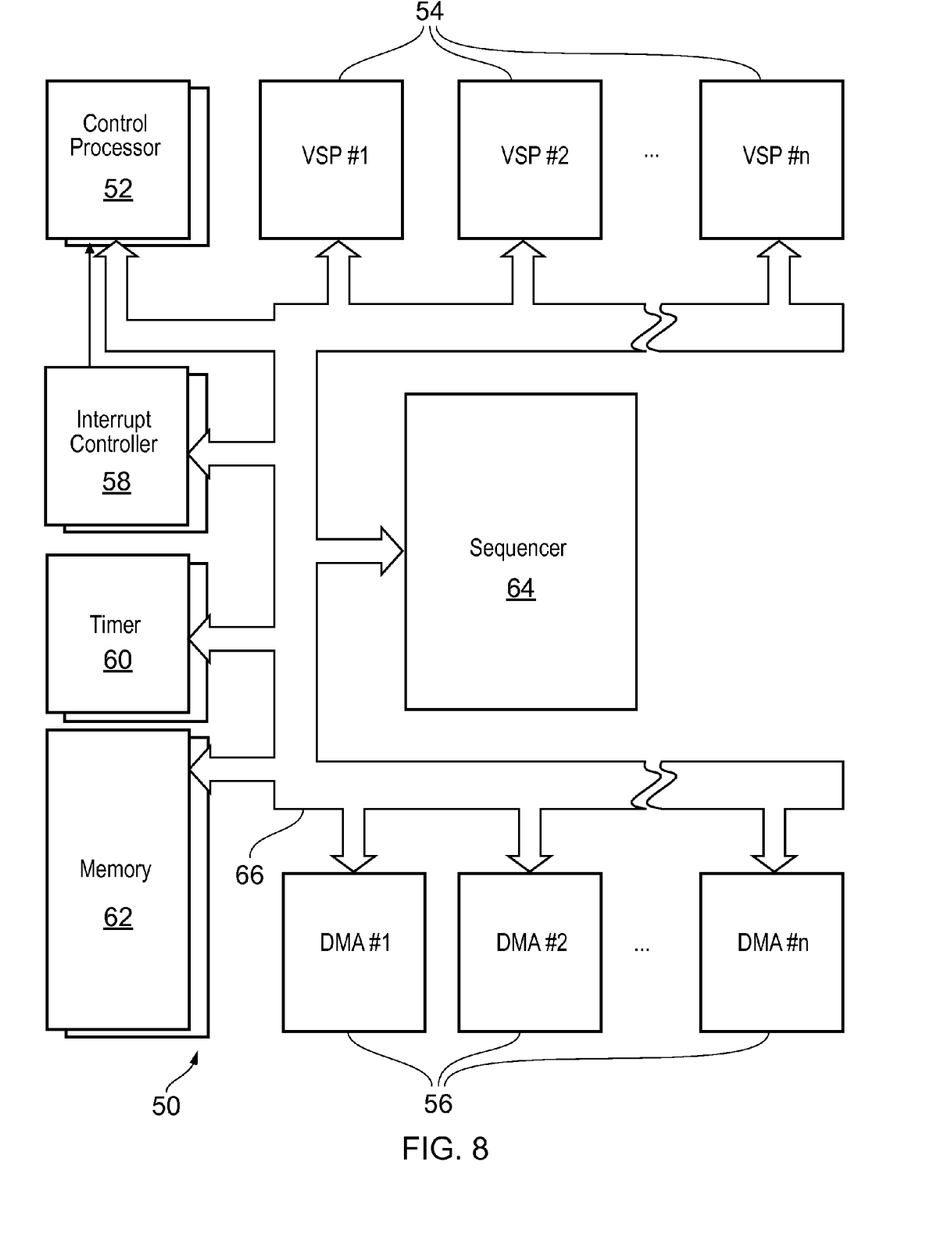

It will be appreciated by a person skilled in the art that the computer 50 might, in an alternative embodiment, include multiple CPUs 52, multiple interrupt controllers 58, multiple timers 60 and multiple memories 62. Such an embodiment is shown in FIG. 8, in which each of the additional CPUs 52, interrupt controllers 58, timers 60 and memories 62 are shown stacked one on another. Where multiple CPUs 52, interrupt controllers 58, timers 60 and memories 62 are provided, the bus may be a multilayer bus, so that the multiple components can communicate with one another. In an alternative embodiment, the sequencer 64 may be omitted, and the tasks of the sequencer are performed by another component, such as one of the CPUs 52.

In the embodiment of the invention described hereinafter, the computer 50 has a single CPU 52, a single interrupt controller 58, a single timer 60 and a single memory 62, as shown in FIG. 7.

The CPU 52 runs the operating system of the computer. For example, the CPU 52 is an ARM RISC processor. The VSPs 54 are DSPs that are multicore, their cores being designed to operate with very long instruction words (VLIW) that have single instruction, multiple data (SIMD) format. The memory 62 stores the instructions and the data that the computer is to process. The DMA controllers 56 allow instructions and data to be read from, and written to, the memory 62 by, for example, the VSPs 54 without burdening the CPU 52 with the conduct of the transfer process. The interrupt controller 58 is responsible for interrupting the CPU 52 over line 68 when external events such as user inputs need to be processed. The timer 60 emits a signal periodically and the other elements of the computer 50 use the signals from the timer as a time base to effect synchronisation of operations.

The central processing unit (CPU) 52, the vector signal processors 54 and the DMA controllers 56 are all capable of conducting processing in parallel with one another and shall henceforth be referred to as the processing elements of the computer 50. This parallelism is extended to a relatively high degree by the multicore nature of the VSPs 54 and yet further by the VLIW and SIMD capabilities of those cores. This relatively high degree of parallelism means that the architecture of computer 50 lends itself to conducting intensive digital signal processing activities, such as the execution in software of computationally intensive wireless telecommunications modems, such as those of the 3GPP-LTE (Third Generation Partnership Project-Long Term Evolution) and CDMA EV-DO (Code Division Multiple Access; Evolution-Data Optimised) standards. The computer 50 also lends itself to use in digital video broadcasting (DVB) wireless network systems, audio/visual processing, including encoding, decoding and transcoding, and multi-modal operation. In order to extend the degree of parallelism, the computer 50 can also include additional processing elements connected to the bus 66, often designed to implement specific signal processing activities—such as a Viterbi accelerator, a turbo decoder and an RF to baseband interface.

The sequencer 64 is arranged to control and co-ordinate the operation of the processing elements in the computer 50 so that desired processing tasks can be performed or, in other words, so that desired UML activity diagrams can be enacted. An example of a UML activity diagram is shown in FIG. 9.

Figure 9:
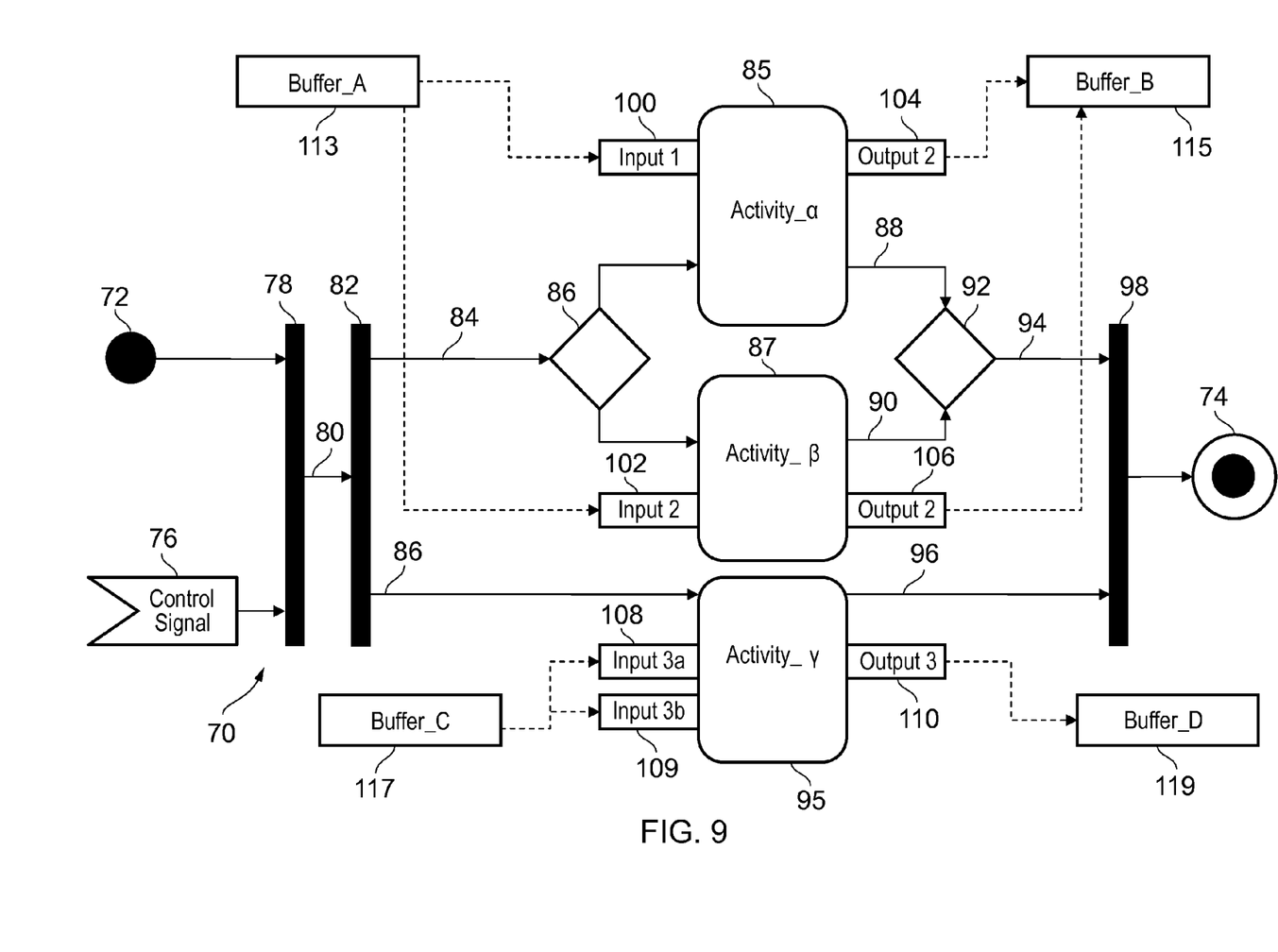
FIG. 9 is a UML activity diagram for a multiprocessor computer.

FIG. 9 shows a UML activity diagram 70 starting at an initial node 72 and ending at a final node 74. The initial node 72 is joined with a control signal 76 at a join node 78. The control output 80 of the join node 78 forms the control input of a fork node 82, which has a first control output 84 and a second control output 86. The first control output 84 forms the control input to a decision node 86, which determines whether activity_α 85 or activity_β 87 is performed. The control outputs 88, 90 from activity_α 85 and activity_β 87 form the control inputs to a merge node 92, which generates control output 94 when it receives either of control outputs 88 or 90.

The second control output 86 of the fork node 82 forms the control input of activity_γ 95. A control output 96 of activity_γ 95 is joined with the control output 94 at a join node 98, the control output of which is passed to the final node 74.

Activities in a UML activity diagram representing a data processing system will typically acquire data, operate on it, and as a result issue modified data. Shown in FIG. 9, the activities 85, 87 and 95 each have data inputs and data outputs. The data input of activity_α 85 is indicated 100 and the data output of that activity is indicated 104. Similarly, the data input of activity_β 87 is indicated 102 and the data output of that activity is indicated 106. Finally, activity_γ 95 happens to have two data inputs 108 and 109 and one data output 110.

The data inputs of the activities 85, 87 and 95 are fed by buffers and the data outputs of those activities feed into buffers. More specifically, activity_α 85 reads data from buffer_A 113 into data input 100 and writes data from data output 104 to buffer_B 115. Likewise, activity_β 87 reads data from buffer_A 113 into data input 102 and writes data from data output 106 into buffer_B 115. Finally, activity_γ 95 reads data from buffer_C 117 into data inputs 108 and 109 and writes data from data output 110 into buffer_D 119. The buffers 113, 115, 117 and 119 are provided by parts of memory 62 that have been allocated to serve as buffers. The allocation of memory blocks to be used as buffers is done before the processing elements of the computer 50 perform the activities in real-time, in a 'walk-through' of the activity sequences. This walk-through enables the processing elements to determine the quantity and size of the memory buffers required to complete each activity. This allocation process shall hereinafter be referred to as "memory allocation". If the memory allocation is not done, then there is a chance that, when the activities are performed in run-time, an activity could attempt to write a data output to a memory buffer which is already full. This might result in an overwrite of data that is needed as an input for an activity, or an inability to write an output, which might cause the processing element to slow down its processing of data, or even stop processing data altogether, until the memory buffer has capacity to receive data, or until an alternative buffer has been allocated.

The walk-through and memory allocation is done during the compilation (design) phase—that is the phase during which the activity sequences are initially put together into the computer 50. The walk-through and memory allocation involves a simulation of the processing elements performing the activities and determining the largest size or capacity of each buffer that might be required, based on the activities that are to be performed. For example, if one of the activities is a QPP interleaver, the simulation may take into account the effect on the size of the required memory of the different data block sizes that can be handled by the interleaver. During the simulation, the average size of the buffers required to perform the activity sequence might also be calculated. The reading from and writing to the buffers is shown by dotted lines in FIG. 9.

The memory 62 is divided into a set of blocks for the purpose of allocating memory resource to the tasks that the processing elements of the computer 50 need to perform. Accordingly, some blocks of the memory 62 are allocated to serve as buffers 113, 115, 117 and 119. Depending on the size of the buffers 113, 115, 117 and 119, more than one block of the memory 62 may be used to provide each of the buffers 113, 115, 117 and 119. The allocation of a number of memory blocks to serve as a buffer is a relatively simple process: the start address of the block or group of blocks of the memory 62 that will serve as the buffer in question are specified to the activity concerned. As a more specific example, the computer 50 specifies to activity a 85 the start address of the block or group of blocks of memory 62 from which can be read the input data for that activity_α 85 and the computer 50 also specifies to activity_α 85 the start address of the memory block or blocks in memory 62 to which the output data of that activity should be written.

The UML diagram 70 can be regarded as a sequence of activities, or an "activity sequence". The allocation of blocks from memory 62 to serve as buffers 113, 115, 117 and 119 must take place before the activity sequence of UML diagram 70 is commenced by the processing elements of the computer 50; otherwise, the activity sequence cannot be performed. It is also to be understood that the computer 50 will commonly be expected to perform not just one activity sequence of the kind that is shown in FIG. 9 but rather a whole series of such activity sequences.

Consider now the case where the memory allocation has been completed during the compilation phase, and the series of activity sequences has to be performed at run-time. There is a need to assign memory blocks to provide the buffers of all the activities in all the activity sequences within the series. Since the walk-through was carried out in the compilation phase, the computer 50 has been allocated a sufficient number of memory blocks to serve as the buffers in order that the latter may cope with the largest possible data flow through the activities. However, when the processing elements perform the activities at run-time, they need to know from which memory block or blocks the input data for a particular activity should be read, and to which memory block or blocks the output data should be written. In other words, the processing elements need to know which memory blocks are providing their buffers. Therefore, the processing elements assign particular memory blocks to serve as the buffers to the activities. The process of assigning memory blocks shall hereinafter be referred to as 'block assignment'. If the block assignment is done while the processing units are performing the activities during the run-time, then there is a chance that the activities will be interrupted, or slowed, while the processing units assign the memory blocks to read from and write to.

The computer 50 is configured to use its processing elements not only to perform the activities within the activity sequences of the series but also to use its processing elements to perform the assignment of memory blocks to the buffers of the activities in the series of sequences. The computer 50 is designed to use its processing elements to complete the assignment of memory blocks to the buffers of an activity sequence prior to the commencement of the performance of that sequence by the processing elements of the computer and—typically—whilst the processing elements of the computer 50 are performing the activities of an earlier activity sequence in the series. That is to say, the computer 50 is often in a situation where it is performing the activities of one sequence in a series of sequences whilst in parallel it is assigning memory blocks for the buffers required for the next activity sequence in the series. So that it can more clearly be understood how the computer 50 interweaves the performance of a series of activity sequences with the block assignment for those sequences, an example is provided in FIG. 10, and that example will now be discussed.

Figure 10:
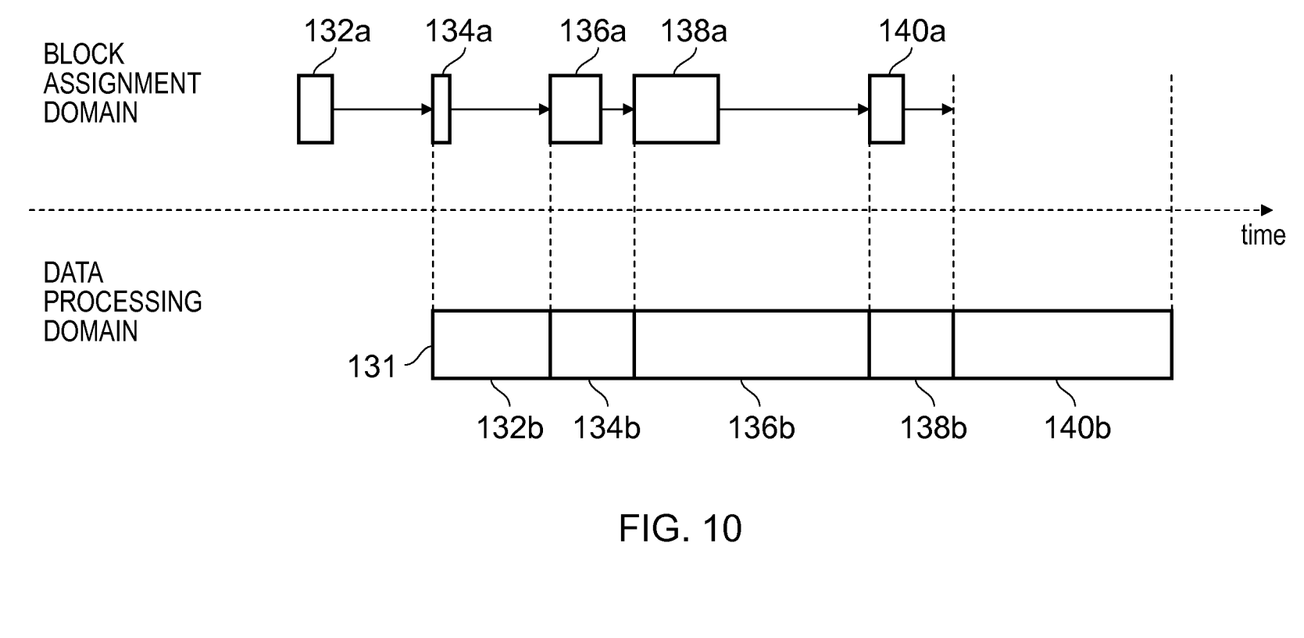
FIG. 10 illustrates how block assignment is carried out by the multiprocessor computer of FIG. 8.

FIG. 10 shows a series 131 of activity sequences that is to be performed by the computer 50. The activity sequences in the series 131 are indicated 132b, 134b, 136b, 138b and 140b. Each of the activity sequences 132b, 134b, 136b, 138b and 140b comprises one or more activities under the control of a number of primitives, just as in the case of the activity sequence of FIG. 9. The computer 50 is to perform the series 131 of activity sequences serially in the order 132b, 134b, 136b, 138b, 140b, as is indicated by the presence of a time axis in FIG. 10. The activities within the activity sequences 132b, 134b, 136b, 138b and 140b of course require blocks from memory 62 to be assigned to serve as buffers.

For each one of the activity sequences 132b, 134b, 136b, 138b and 140b, the assignment of memory blocks to serve as buffers for that activity sequence is completed before the commencement of that activity sequence and whilst the preceding activity sequence, if any, is being performed by the computer 50. The memory block assignment processes for each of the activities sequences 132b, 134b, 136b, 138b and 140b are in fact shown in FIG. 10 and are indicated 132a, 134a, 136a, 138a and 140a. It will be observed that the process 132a of assigning memory blocks for activity sequence 132b is completed before activity sequence 132b is commenced. Similarly, it will be observed that:

whilst activity sequence 132b is being performed by the computer 50, the process 134a of assigning memory blocks for activity sequence 134b is conducted and completed before activity sequence 132b is completed and before activity sequence 134b is commenced.

whilst activity sequence 134b is being performed by the computer 50, the process 136a of assigning memory blocks for activity sequence 136b is conducted and completed before activity sequence 134b is completed and before activity sequence 136b is commenced.

whilst activity sequence 136b is being performed by the computer 50, the process 138a of assigning memory blocks for activity sequence 138b is conducted and completed before activity sequence 136b is completed and before activity sequence 138b is commenced.

whilst activity sequence 138b is being performed by the computer 50, the process 140a of assigning memory blocks for activity sequence 140b is conducted and completed before activity sequence 138b is completed and before activity sequence 140b is commenced.

The block assignment process may go beyond simply designating which of the allocated memory blocks are to serve as a buffer, in as much as the block assignment process may specify how the memory blocks are to behave within the buffers. For example, consider the case where three memory blocks are assigned to serve as a buffer for an activity requiring a circular output buffer that is two memory blocks deep; that is to say, that the buffer must be capable of storing outputs of the two most recent iterations of the activity that feeds the buffer. The block assignment process in this situation provides, in addition to the memory blocks, the rule specifying which one of the three memory blocks should be used for receiving data input and which one of the three memory blocks should be used for reading data output at any given time. An example of such a rule will now be provided by reference to FIG. 12, which shows, schematically, the three assigned memory blocks 132, 134 and 136 that form the exemplary circular buffer.

Figure 12:
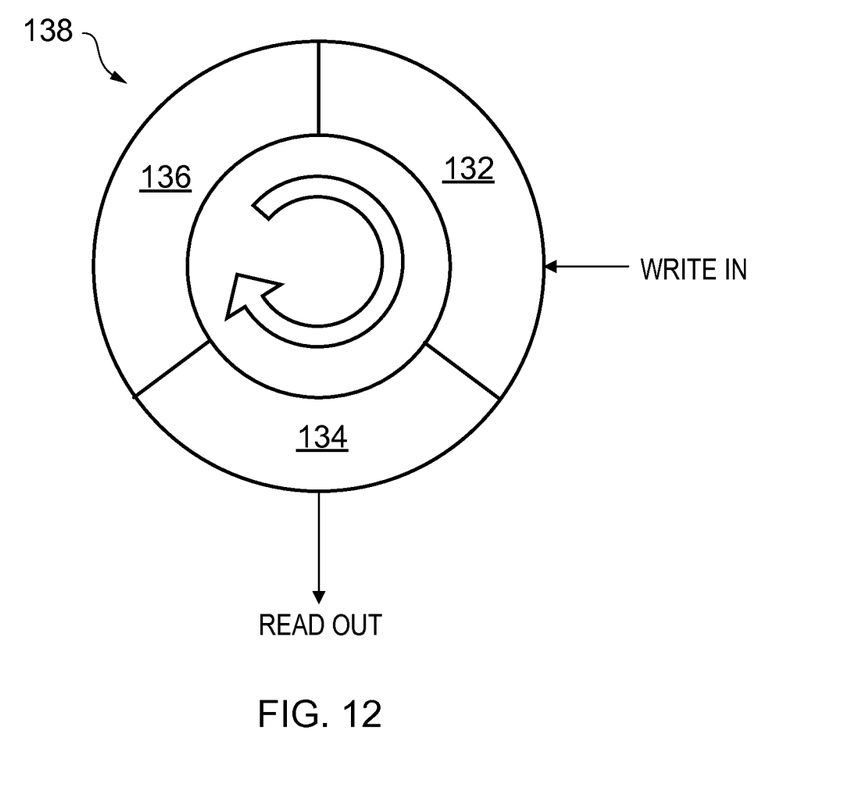
FIG. 12 schematically illustrates a circular buffer formed of memory blocks.

The circular buffer 138 is shown in its initial arrangement in FIG. 12, with data being written into block 132 and read from block 134. The rule provided by the block assignment process is that, for the next iteration of the activity feeding the buffer 138, block 136 is used for receiving data whilst data is read from block 132. Then, in the next iteration of the activity feeding the buffer 138, block 134 is used for receiving data whilst data is read from block 136. Then, in the next iteration, data is written to block 132 and read from block 134, i.e. the buffer has cycled through to its initial state. The three memory blocks 132, 134, 136 can thus be thought of as a wheel that rotates clockwise past the write in and read out positions shown in FIG. 12. Hence, it can be said that the block assignment process in this example provides a "buffer rolling" rule or behaviour to buffer 138. It will be appreciated that in this example the buffer 138 has a redundant memory block. This extra capacity is built in by the memory allocation process that is done at compilation-time to cater tor a worst case scenario where the buffer needs to be three iterations deep.

FIG. 9 is in fact divided into two domains, a block assignment domain—shown above the time axis—and a data processing domain—shown below the time axis. The processes 132a to 140b shown in both domains are all carried out by processing elements of the computer 50.

With the computer 50 interweaving the performance of activity sequences and their necessary block assignment processes in this way, the time taken to perform the block assignment processes does not hinder the performance of the activity sequences, thus facilitating efficient execution of a series of activity sequences. Viewed from a different perspective, this "interweaving" can be interpreted as a just-in-time block assignment that is performed during run-time. The "just-in-time" nature of this block assignment can lead to further efficiencies, as will now be explained.

Figure 11:
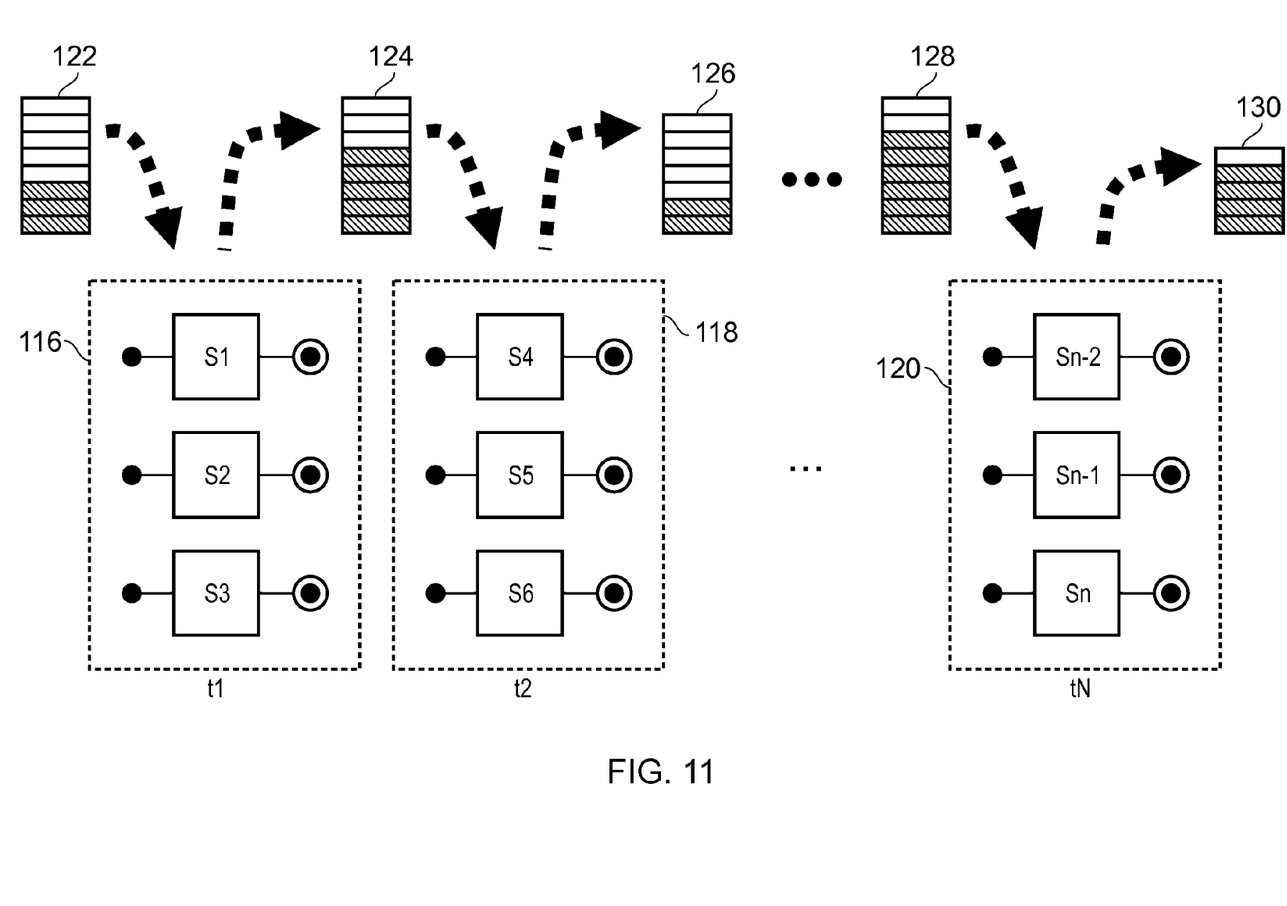
FIG. 11 schematically illustrates release of memory block reservations in the multiprocessor computer of FIG. 9.

FIG. 11 shows, schematically, how the computer 50 undertakes the some high-level task that comprises a number of activity sequences S1 to Sn. Each of the activity sequences S1 to Sn can be assumed to be of the kind illustrated in FIG. 8; that is to say, comprising primitives and one or more activities, each activity requiring one or more data inputs, and having one or more data outputs. During a so-called compilation time, it is determined that the activity sequences should be performed in N groups, each group being executed by the processing elements of the computer 50 in parallel over the course of a respective time period, FIG. 11 shows the result of the compilation process, it is determined that the high-level task will be performed as shown in FIG. 11. Thus, during interval t1, the computer 50 will execute a first group 116 of activity sequences S1, S2, S3 in parallel. Next, in interval t2, the computer 50 will execute a second group 118 of activity sequences S4, S5, S6 in parallel. And so the execution plan continues in the same manner until the $N^{th}$ and final interval, in which the computer will execute an $N^{th}$ group 120 of activity sequences Sn-2, Sn-1, Sn. Of course, it is purely for ease of illustration that groups 116, 118 and 120 are shown with three activity sequences apiece, or indeed that they have a common number of activity sequences at all.

FIG. 11 also shows the set of memory blocks that are allocated (or reserved) at compilation time to provide the input and output buffers for the groups of activity sequences that are to be performed in the various time intervals t1 to tN. For interval t1, a set 122 of blocks from memory 62 is allocated to provide the input buffers for group 116 and a set 124 of blocks from memory 62 is allocated to provide the output buffers for group 116. For interval t2, set 124 provides the input buffers for group 118 and a set 126 of blocks from memory 62 is allocated to provide the output buffers for group 118. So the pattern continues until for interval tN we find a sets 128 and 130 of blocks from memory 62 being allocated to provide the input and output buffers, respectively, for the $N^{th}$ group 120. Each of the sets 122, 124, 126, 128, 130 is represented as a stack of rectangles, each rectangle representing one of the memory blocks that has been allocated to the set in question. Thus, in this example, the compilation process allocates 8 memory blocks for set 122, 8 memory blocks for set 124, 7 memory blocks for set 126, 8 memory blocks for set 128 and 5 memory blocks for set 130. The chain-line arrows are intended to indicate the reading of data from and the writing of data to the sets 122, 124, 126, 128, 130.

Consider the case where some but not all of the memory blocks allocated to the sets 122, 124, 126, 128, 130 are used during run-time to provide the necessary data input and output buffers. This "under use" can arise because the allocation of the memory blocks to the sets 122, 124, 126, 128, 130 at compilation time is normally a cautious estimation that tends to over, rather than under, estimate the number of memory blocks that will be required. The allocation of memory blocks is done based on a worst-case scenario, so that the maximum number of blocks that an activity or activity sequence might require is allocated. FIG. 11 also illustrates an example of such an "under use" scenario, with the shaded memory blocks in each of the sets 122, 124, 126, 128, 130 representing the memory blocks that are actually used during run-time. It can thus be seen that during this particular performance of the high-level task that sequences S1 to Sn represent, a number of blocks go unused in each of the sets 122, 124, 126, 128, 130.

It will be recalled that the computer 50 is in fact configured to assign the memory blocks required for an activity sequence just prior to the commencement of that sequence (as explained with reference to, in particular. FIG. 10). Thus, the computer 50 can recognise at run time, on the basis of the amount of data that is actually being generated in the current performance of the high-level task that activity sequences S1 to Sn represent, the condition where too many memory blocks have been allocated at compilation-time for one or more of the sets 122, 124, 126, 128, 130. The computer 50 is configured to respond to this condition by removing the allocation of the unneeded memory blocks so that the unneeded blocks can then be used by the computer 50 for other things (such as augmenting a buffer whose size has been underestimated at compilation time) or even powered down to save energy.

In an alternative embodiment, different regions of the memory 62 are located in different power domains. That is to say, memory blocks are grouped together to form one or more groups of memory blocks. Each group of blocks may receive power from a separate power feed, or a number of groups may receive power from a single power feed. The grouping of memory blocks together can be done so that some or all of the unneeded memory blocks are within a group powered by a separate power feed. That way, if all of the blocks in that group are unneeded, then the power feed to that group can be turned off and that group of unneeded memory blocks can be powered down. In this way, energy can be saved, but the number of memory blocks allocated to be used as buffers, and the manner in which the computer functions during the nm-time are not affected.

As a somewhat more concrete example, consider the case where activity sequence group 118 corresponds to activity sequence 136b of FIG. 10. In that case, block assignment process 136a, which is performed at run-time, determines the number of memory blocks that are allocated for sets 124 and 126, and if it is determined that some of those blocks are unneeded then the unneeded blocks may be released as described above.

Some embodiments of the invention have now been described. It will be appreciated that various modifications may be made to these embodiments without departing from the from the scope of the invention, which is defined by the appended claims.

What is claimed is:

1. A method of processing data by a computer having processing means and data storage, the method comprising:

providing two or more activity sequences that are to be performed in series by the computer during a run-time, each of the activity sequences requiring input data and producing output data; and determining, during the run-time for each of the activity sequences, locations in the data storage from which the input data is to be read and to which the output data is to be written by the processing means;

estimating, during a compilation time, a maximum proportion of the data storage required to store data written to and read from the data storage for one or more of the activity sequences, wherein the estimating is performed prior to the determining;

wherein, for each of the activity sequences, recognizing that a part of the data storage that was reserved for the activity sequences is unneeded during the run-time execution of that activity sequences and releasing the reservation of that part;

wherein, for at least one of the activity sequences, said locations are determined during the run-time, prior to the commencement of the at least one of the activity sequences and subsequent to the commencement of at least one other of the activity sequences; and wherein said locations in the data storage are grouped to form groups of memory blocks, and the method further comprises powering down one or more groups of unneeded memory blocks.

2. The method according to claim 1, wherein, for a particular activity sequence, said locations are determined while an activity sequence immediately preceding said particular activity sequence is being performed.

3. The method according to claim 1, wherein the method further comprises:

reserving said proportion of the data storage for the processing means to write data to and read data from during the run-time, wherein the reserving is performed prior to the determining.

4. The method according to claim 1, wherein said determining comprises determining an order in which the or each activity sequence will use the locations.

5. The method according to claim 1, wherein at least part of the data storage functions as a buffer for the at least one of the activity sequences.

6. The method according to claim 5, wherein each activity sequence comprises at least one activity and said at least part of the data storage functions as a circular buffer for at least one of activities.

7. The method according to claim 1, wherein the or each activity sequence can be described using a Unified Modelling Language (UML) diagram.

8. The method according to claim 3, wherein the unneeded part of the data storage is used to augment a part of the data storage reserved for a different activity sequence.

9. The method according to claim 3, wherein the unneeded part of the data storage is powered down.

10. The method according to claim 1, wherein the or each activity sequence comprises a sequence of a plurality of activities.

11. The method according to claim 1, wherein each activity sequence comprises at least one activity.

12. A method of determining data storage requirements of a computer for carrying out a data processing task, the computer having processing means and data storage, the method comprising:

providing two or more activity sequences that are to be performed in series by the computer in a run-time, each of the activity sequences requiring input data and producing output data;

determining, during the run-time for each of the activity sequences, locations in the data storage from which the input data is to be read and to which the output data is to be written by the processing means, wherein, for at least one of the activity sequences, said locations are determined during the run-time, prior to the commencement of the at least one of the activity sequences and subsequent to the commencement of at least one other of the activity sequences;

estimating, during a compilation time, for one or more of the activity sequences, a maximum proportion of the data storage required to store data written to and read from the data storage, wherein the estimating is performed prior to the determining;

reserving, during the compilation time, said proportion of the data storage for the processing means to write data to and read data from;

recognizing that a part of the data storage that was reserved for the activity sequences is unneeded during the run-time execution of that activity sequences and releasing the reservation of that part;

grouping said locations in the data storage, wherein said locations are grouped to form groups of memory blocks; and powering down one or more groups of unneeded memory blocks.

13. The method according to claim 12, wherein the unneeded part of the data storage is used to augment a part of the data storage reserved for a different activity sequence.

14. The method according to claim 12, wherein the unneeded part of the data storage is powered down.

15. The method according to claim 12, wherein each activity sequence comprises at least one activity.

16. An apparatus for processing data, the apparatus comprising:

a processor arranged to perform two or more activity sequences that are to be performed in series during a run-time, each of the activity sequences requiring input data and producing output data; and data storage from which the input data is to be read and to which the output data is to be written by the processor;

wherein the processor is further arranged to:

determine, for each of the activity sequences, during the run-time and prior to commencement of the respective activity sequence and subsequent to the commencement of at least one other activity sequences, locations in the data storage from which the input data is to be read and to which the output data is to be written by the processor;

estimate, during a compilation time, a maximum proportion of the data storage required to store data written to and read from the data storage for one or more of the activity sequences, wherein the estimating is performed prior to the determining;

recognize, for each of the activity sequences, that a part of the data storage that was reserved for the activity sequences is unneeded during the run-time execution of that activity sequences and releasing the reservation of that part;

group said locations in the data storage to form groups of memory blocks, and power down one or more groups of unneeded memory blocks.

17. The apparatus according to claim 16, wherein the processor is further arranged to, for a particular activity sequence, to determine said locations while an activity sequence immediately preceding said particular activity is being performed.

18. The apparatus according to claim 16, further comprising:
  a controller arranged to reserve said proportion of the data storage for the processor to write data to and read data from during the run-time.

19. The apparatus according to claim 16, wherein the processor is further arranged to determine the order in which the or each activity sequence will use the locations.

20. The apparatus according to claim 16, wherein the unneeded part of the data storage is used to augment a part of the data storage reserved for a different activity sequence.

21. The apparatus according to claim 16, wherein the unneeded part of the data storage is powered down.

22. The apparatus according to claim 16, wherein the or each activity sequence comprises a sequence of a plurality of activities.

23. The apparatus according to claim 16, wherein each activity sequence comprises at least one activity.

24. An apparatus for determining data storage requirements for a computer, the apparatus comprises:
  wherein the computer comprises a processor and data storage, the computer is configured to perform two or more activity sequences in series in a run-time, each of the activity sequences requires input data and produces output data
  the processor is arranged to determine, during the run-time for each of the activity sequences, locations in the data storage from which the input data is to be read and to which the output data is to be written by the processor, wherein, for at least one of the activity sequences, said locations are determined during the run-time, prior to the commencement of the at least one of the activity sequences and subsequent to the commencement of at least one other of the activity sequences;
  an estimator arranged to estimate, during a compilation time, for one or more of the activity sequences, a maximum proportion of the data storage required to store data written to and read from the data storage, wherein the estimating is performed prior to the determining; and
  a controller arranged to reserve, during the compilation time, said proportion of the data storage for the processor to write data to and read data from;
  a detector arranged to recognize, for each of the activity sequences, that a part of the data storage that was reserved for the activity sequences is unneeded during the run-time execution of that activity sequences and releasing the reservation of that part; and
  the computer is further configured to:
    group said locations in the data storage to form groups of memory blocks, and
    power down one or more groups of unneeded memory blocks.

25. The apparatus according to claim 24, wherein the unneeded part of the data storage is used to augment a part of the data storage reserved for a different activity sequence.

26. The apparatus according to claim 24, wherein the unneeded part of the data storage is powered down.

27. The apparatus according to claim 24, wherein each activity sequence comprises at least one activity.

* * * * *